United States Patent [19]

Kikuchi

[11] 4,090,617
[45] May 23, 1978

[54] LOADING AND UNLOADING DEVICE FOR A WORKPIECE

[75] Inventor: Shinichi Kikuchi, Narashino, Japan
[73] Assignee: Seiko Seiki Kabushiki Kaisha, Japan
[21] Appl. No.: 767,052
[22] Filed: Feb. 9, 1977

[30] Foreign Application Priority Data

Feb. 10, 1976 Japan .................................. 51-13595

[51] Int. Cl.² ........................................... B65G 47/90
[52] U.S. Cl. ................................ 214/1 BB; 198/486; 214/1 F
[58] Field of Search ................. 214/1 BB, 1 BT, 1 F, 214/1 R, 8.5 C, 8.5 D; 198/486

[56] References Cited

U.S. PATENT DOCUMENTS

| | | | |
|---|---|---|---|
| 3,527,365 | 9/1970 | Leonard | 214/1.3 |
| 3,823,836 | 7/1974 | Cheney et al. | 214/1 BT X |
| 3,910,423 | 10/1975 | Killian et al. | 214/1 BB |
| 3,915,312 | 10/1975 | Clark | 214/1 BT X |
| 4,032,022 | 6/1977 | Smith | 214/1 BB X |

*Primary Examiner*—Frank E. Werner
*Attorney, Agent, or Firm*—Robert E. Burns; Emmanuel J. Lobato; Bruce L. Adams

[57] ABSTRACT

A device for loading and unloading workpieces comprises a downwardly extending magazine chute at the lower end of which there is a first workpiece carrier which reciprocates in a direction transverse to the magazine chute. The first workpiece carrier receives a workpiece from the magazine chute and delivers it to a second workpiece carrier which reciprocates in a direction parallel to the magazine chute. The second workpiece carrier then transfers the workpiece to the working location of a machine where the workpiece is located and machined while still being held by the second workpiece carrier. After completion of the machining operation the second workpiece carrier returns to its initial position whereupon the workpiece drops down through an unloading chute. The first workpiece carrier engages one portion of the workpiece while the second workpiece carrier engages another portion of the workpiece so that the two workpiece carriers do not interfere with one another.

4 Claims, 4 Drawing Figures

LOADING AND UNLOADING DEVICE FOR A WORKPIECE

FIELD OF INVENTION

The present invention relates to a loading and unloading device for delivering workpieces to and removing them from a working location, for example the work station of a machine-tool, such as an internal grinder.

BACKGROUND OF THE INVENTION

In the prior art a device having a swivel arm, a device for transferring workpieces by their dead weight and the like have been developed for supplying workpieces to and removing them from machine-tools. However there are problems with the swivel arm device of which one is lack of strength and another is lack of loading accuracy particularly when handling larger workpieces. The device in which the workpieces are transferred by their dead weight is slow in operation and is therefore unsuitable for mass production.

SUMMARY OF THE INVENTION

It is therefore an object of the present invention to provide a workpiece loading and unloading device which eliminates the above mentioned defects of the prior art and is capable of quick, reliable and accurate operation.

In accordance with the invention there is provided a workpiece loading and unloading device comprising a downwardly extending magazine chute which is charged with the workpieces. A first workpiece carrier reciprocable in a direction transverse of the magazine chute receives a workpiece from the lower exit end of the chute and delivers it to a second workpiece carrier which is reciprocable in a direction parallel to the magazine chute. The second workpiece carrier receives the workpiece from the first workpiece carrier and moves it to the working location of the machine. The workpiece remains held by the second workpiece carrier while it is being machined. Upon completion of the machining operation, the second workpiece carrier returns to its initial position whereupon the workpiece drops through an unloading chute.

BRIEF DESCRIPTION OF DRAWINGS

The nature, objects and advantages of the invention will be more fully understood from the following description of a preferred embodiment shown by way of example in the accompanying drawings in which.

DESCRIPTION OF PREFERRED EMBODIMENT

Figure 1:
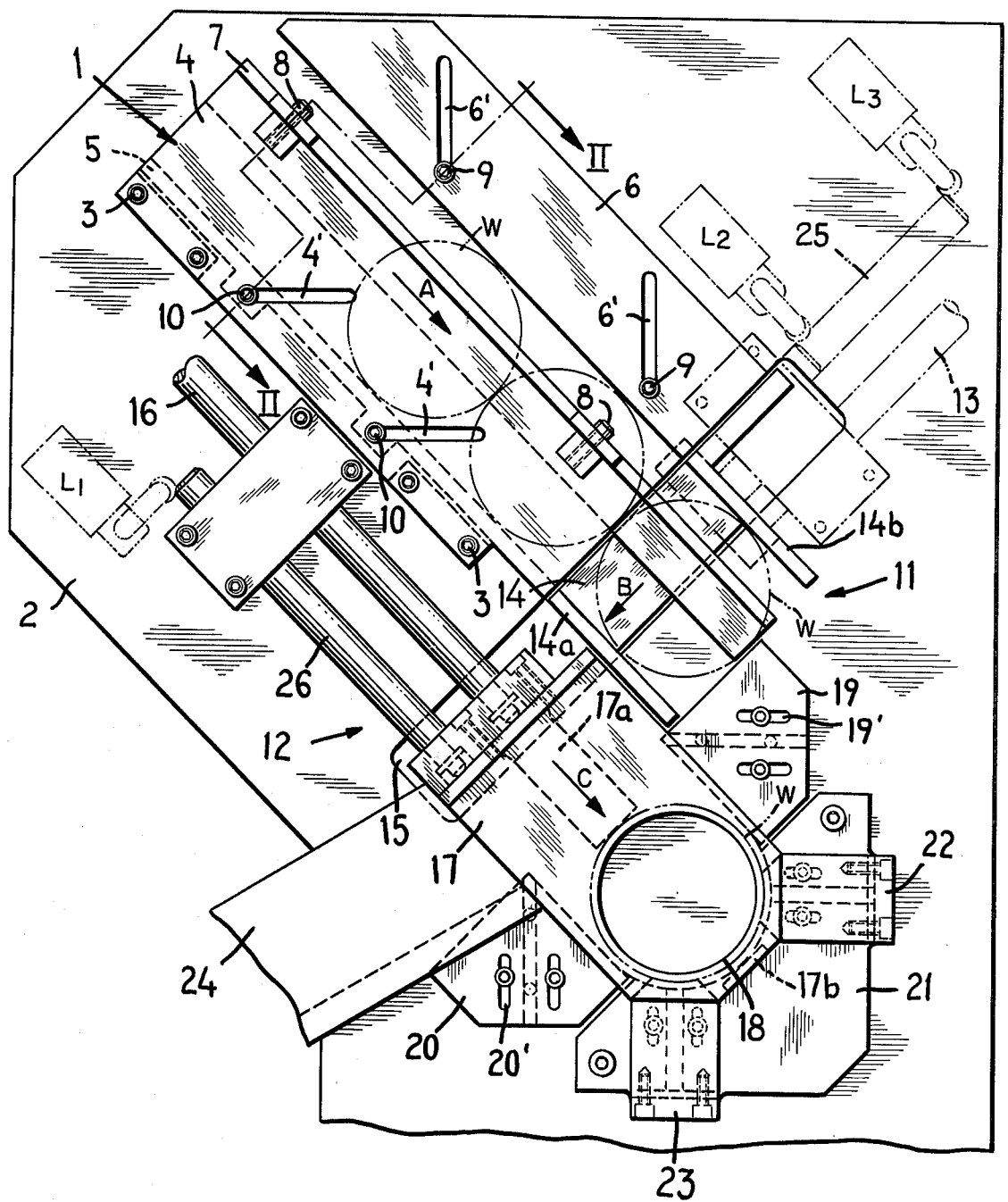
FIG. 1 is a front view of a workpiece loading and unloading device according to the invention.
Figure 2:
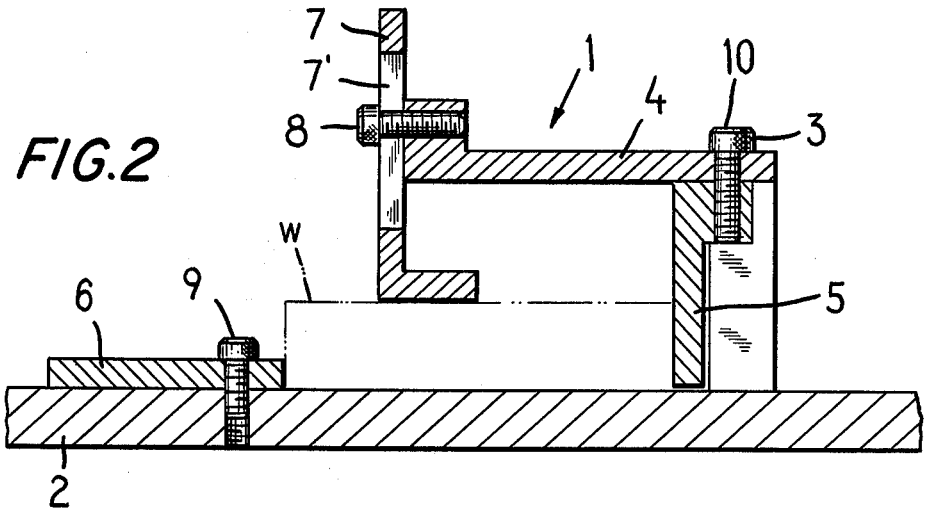
FIG. 2 is a sectional view taken approximately on the line II—II in FIG. 1 and FIGS. 3 and 4 are schematic sectional views showing respectfully first and second workpiece carriers of the loading and unloading device of the invention.

As shown by way of example in the drawings, the workpiece loading and unloading device of the present invention comprises a magazine chute 1 which is inclined downwardly and has workpieces W therein. The magazine chute 1 is securely affixed by bolts 3 on a base plate 2 which is mounted in proper position on the base of the machine served by the loading and unloading device. The magazine chute comprises a cover plate 4, a support wall 5, a side guide plate 6 and an upper guide plate 7 as is well shown in FIG. 2. The upper guide plate 7 is fixed on the cover plate 4 by bolts 8 which are inserted through transverse slots 7' in the guide plate 7 to permit adjustment of the guide plate 7 in the thickness direction of the workpiece W. The side guide plate 6 guides the workpieces W opposite the support wall 5 and is provided with slots 6' in an oblique direction of 45° to the direction of travel of the workpieces W (arrow A) and is adjustably affixed on the support plate 2 by bolts 9 extending through the slots 6'. The cover plate 4 is also provided with slots 4' in an oblique direction of 45° to the direction of travel of the workpieces and is adjustably mounted on the support wall 5 by bolts 10 which extend through the slots 4'.

A transfer mechanism 11 receives workpieces one at a time from the lower exit end of the magazine chute 1 and delivers them to a loading and unloading mechanism 12. The transfer mechanism 11 comprises a first workpiece carrier 14 connected by a first piston rod 13 to a first hydraulic cylinder (not shown). The workpiece carrier 14 is inserted in a wide slot 15 of the plate 2 which extends perpendicular to the magazine chute 1. The workpiece carrier is movable longitudinally of the slot 15 by the hydraulic cylinder and piston rod 13 so as to reciprocate in a direction perpendicular to the direction of the arrow A. On its front face the workpiece carrier 14 is provided with a shallow chamber of U-shaped cross section formed by wall 14a and 14b which extend latterly of the body portion 14c in the slot 15 so as to overlie and project from adjacent portions of the plate 2. The first piston rod 13 and a guide rod 25 which is parallel thereto are retained and guided by a guide plate 27 secured to the base plate 2.

The loading and unloading mechanism 12 comprises a second workpiece carrier 17 connected by a second piston rod 16 to a second hydraulic cylinder (not shown) for reciprocation in a direction parallel to the direction of the arrow A. On its underside the second workpiece carrier 17 is provided with a shallow chamber of U-shaped cross section defined by projecting walls 17a and 17b. Between the projecting walls 17a and 17b the second workpiece carrier 17 is provided with an opening 18 for receiving a tool for operating on the workpiece, for example a grinding wheel. The piston rod 16 and a guide rod 26, which is connected with the second workpiece carrier 17 and is parallel to the piston rod 16 are guided and retained by a guide plate 28 affixed to the base plate 2.

In its movement to the working location of the machine by the second workpiece carrier 17, the workpiece is guided laterally by guide members 19 and 20 which are adjustably affixed on the base plate 2 by screws 19a and 20a extending through slots 19' and 20' disposed obliquely at 45° to the direction of the arrow A. The workpiece is located and supported in the working position by a pair of shoes 22 and 23 affixed on a shoe holder 21 secured to the base plate 2. The shoes 22 and 23 are adjustable in their set position in accordance with the workpiece diameter by means of screws 22a and 23a. Movement of the shoes on the shoe holder 21 is permitted by slots 22b and 23b respectfully through which screws 22c and 23c extend to secure the shoes adjustably to the shoe holder.

Adjacent of the lower guide member 20, there is provided an unloading chute 24 through which the workpiece drops after it has been retracted from the working position by return movement of the second workpiece carrier 17. Movement of the workpiece carriers 14 and 17 is controlled by suitable limit switches. Thus a limit switch L1 is engagable by the guide rod 26 of the second workpiece carrier 17. Limit switches $L_2$ and $L_3$ are respectfully engagable by the guide rod 25 of the first workpiece carrier 14.

Figure 3:
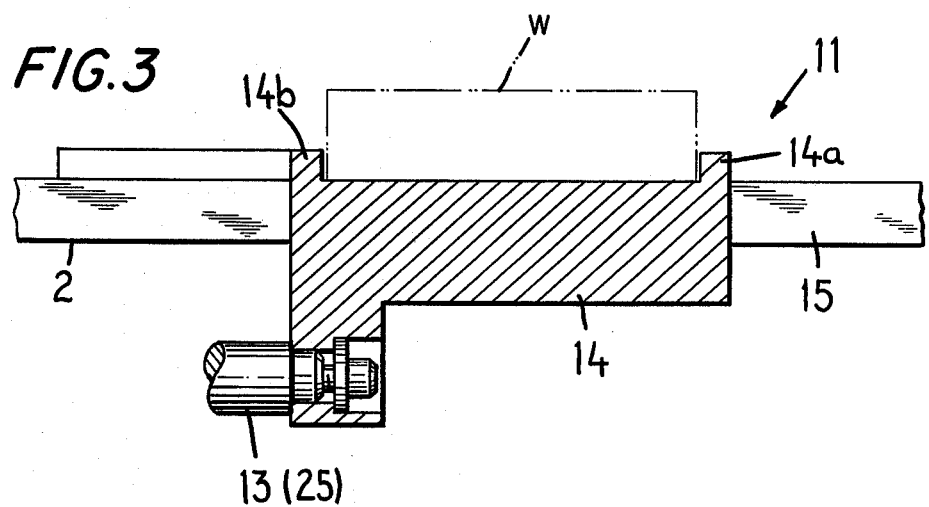
Figure 4:
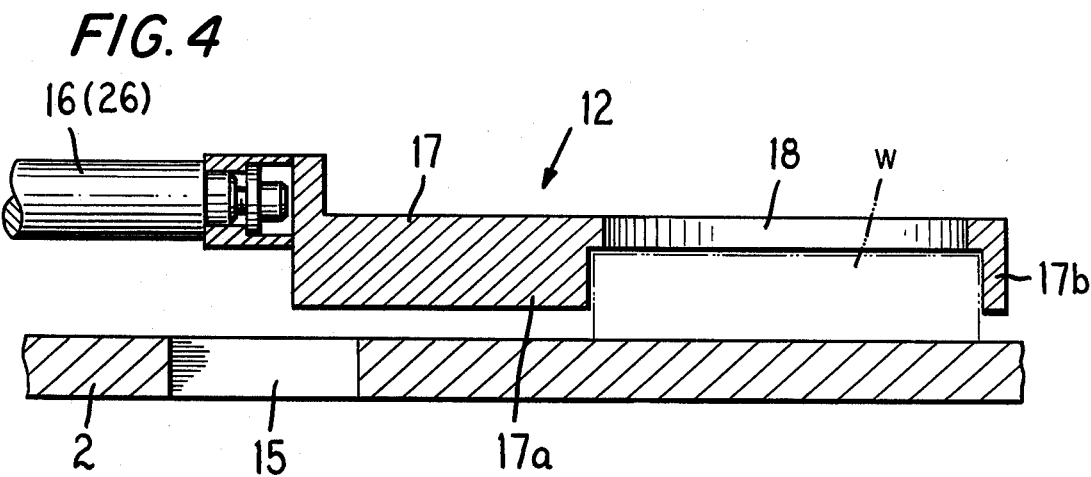

In the operation of the loading and unloading device according to the invention workpieces W charged in the magazine chute 1 move downwardly by their dead weight in the direction of the arrow A, the lowest one being received between the projecting walls 14a and 14b of the first workpiece carrier 14 when in retracted position. The first workpiece carrier 14 is then moved in the direction of the arrow B by the first piston rod 13 with the workpiece retained between the projecting walls 14a and 14b. The first workpiece carrier 14 is moved in the direction of arrow B, the second workpiece carrier 17 is retained by the second piston rod 16 in its initial or retracted position. Accordingly the first workpiece carrier 14 delivers the workpiece into the chamber between the projecting walls 17a and 17b of the second workpiece carrier 17. As shown in FIGS. 3 and 4 the first workpiece carrier 14 supports the workpiece W at one end thereof while the second workpiece carrier 17 supports the workpiece at the other end thereof so that the crossing of the first and the second workpiece carriers 14 and 17 does not cause any interference.

Next the second workpiece carrier 17 is advanced by the second piston rod 16 and the projected wall 17a of the second workpiece carrier 17 pushes the workpiece W forward between the walls 14a and 14b of the first workpiece carrier 14 and between the guide members 19 and 20 in the direction of arrow C. When the workpiece W comes into contact with the shoes 22 and 23 a magnet (not shown) chucks it there and the machining is carried out on the workpiece W, for example by means of a tool or grinding wheel entering through the opening 18. In the mean time, the first workpiece carrier 14 is returned to its initial position by the first piston rod 13 under control of the limit switch $L_3$ to receive the following workpiece W.

After the workpiece has been machined; the second workpiece carrier 17 is returned to its initial position by the second rod 16, the workpiece being withdrawn from the working position by the projecting wall 17b of the second workpiece carrier 17. Upon return of the second workpiece carrier 17 to its initial position the chamber between the projecting walls 17a and 17b opens into the unloading chute 24 whereupon the machined workpiece W drops out through the chute 24 by its dead weight. At the same time the first piston rod 13 again advances the first workpiece carrier 14 to supply another workpiece W to the second workpiece carrier 17, the loading and unloading cycles described above are being repeated.

For larger or smaller workpieces the first and second workpiece carrier should be exchanged while adjustable members 4, 6, 19 and 20 are adjusted within the ranges of slots 4', 6', 19' and 20' to the size of the workpiece being handled.

While a preferred embodiment of the invention has been illustrated in the drawings and is herein particularly described it will be understood that modifications may be made and that the invention is thus in no way limited to the illustrated embodiment.

What I claim is:

1. A workpiece loading and unloading device for a machine comprising a base plate, a downwardly extending workpiece feeding magazine chute mounted on said base plate and having an exit at its lower end, a first workpiece carrier reciprocable on said base plate in a direction perpendicular to said magazine chute between a first position for receiving a workpiece from the exit of said magazine chute and a second position, means for reciprocating said first workpiece carrier between said first and second positions, a second workpiece carrier reciprocable on said base plate between an initial position for receiving said workpiece from said first workpiece carrier and a working location of said machine, means for reciprocating said second workpiece carrier in timed relation with the reciprocation of said first workpiece carrier, means for chucking said workpiece in said working location while still held by said second workpiece carrier, said second workpiece carrier comprising means for withdrawing said workpiece from said working location in returning toward said initial position and means for discharging said workpiece from said second workpiece carrier upon withdrawal.

2. A workpiece loading and unloading device according to claim 1, in which the paths of movement of said workpiece carriers cross and in which said first and second workpiece carriers engage different positions of a workpiece whereby said first and second workpiece carriers do not interfere with one another.

3. A workpiece loading and unloading device according to claim 2, in which said first workpiece carrier comprises a shallow channel receiving one portion of a workpiece and said second workpiece carrier comprises a shallow channel receiving an opposite portion of said workpiece, said channel of each of said workpiece carriers being defined by channel sides extending perpendicular to the direction of movement of the respective workpiece carrier.

4. A workpiece loading and unloading device according to claim 1, in which said discharging means comprises a discharge chute extending downwardly from the path of movement of said second workpiece carrier.

* * * * *